Nov. 8, 1938.   F. S. HODGMAN   2,136,213
MECHANICAL SERVO MECHANISM
Filed Aug. 3, 1935
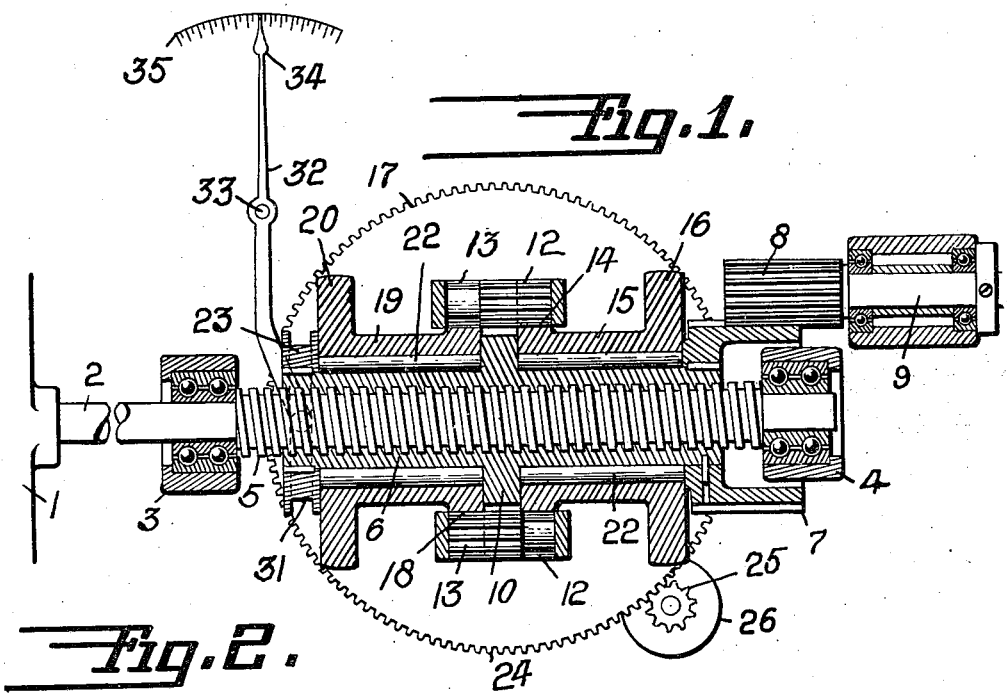
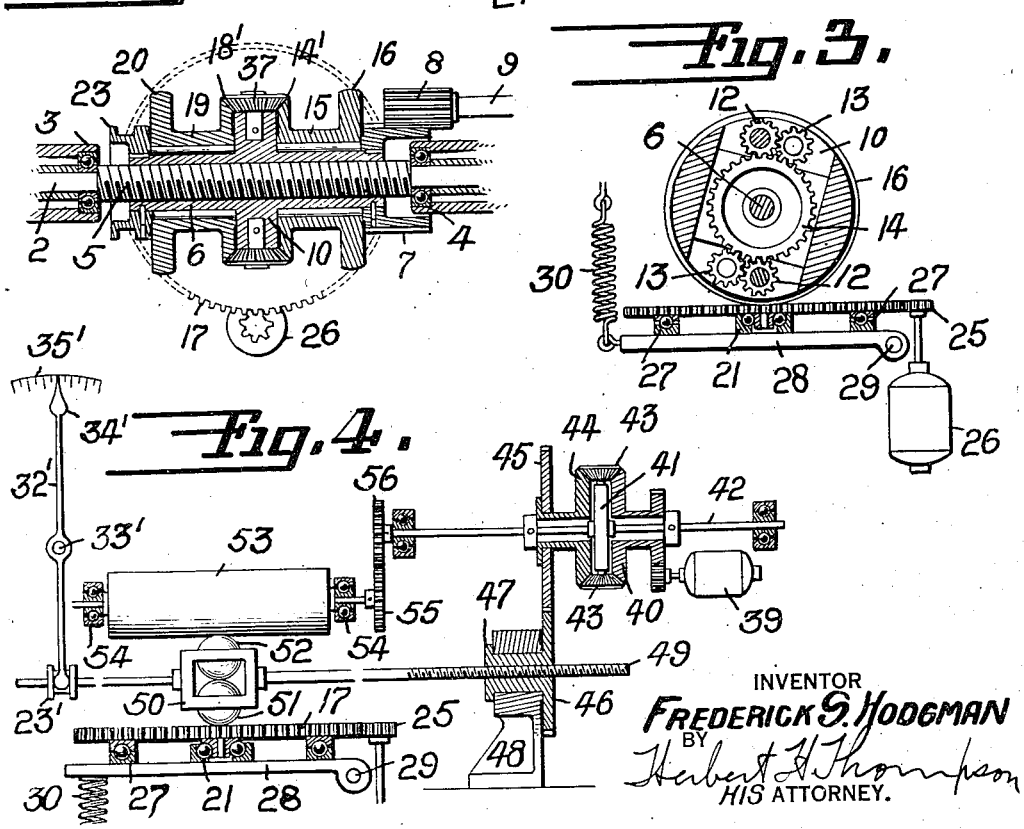
INVENTOR
FREDERICK S. HODGMAN
BY
Herbert H Thompson
HIS ATTORNEY.

Patented Nov. 8, 1938

2,136,213

UNITED STATES PATENT OFFICE 2,136,213

MECHANICAL SERVO MECHANISM

Frederick S. Hodgman, Glen Rock, N. J., assignor to Sperry Gyroscope Company, Inc., Brooklyn, N. Y., a corporation of New York Application August 3, 1935, Serial No. 34,530

9 Claims. (Cl. 74—395)

This invention relates, generally, to servo mechanisms or torque amplifiers, and the invention has reference, more particularly, to a novel construction of mechanical servo mechanism adapted for various uses such as the steering of water and air craft.

The principal object of the present invention is to provide a novel mechanical servo mechanism so constructed and arranged, that a rotatable control member or primary element, capable of exerting but a relatively feeble torque, is enabled to operate a rotatable controlled member or secondary element requiring a relatively considerable torque at the same speed of rotation as said control member, power for driving said controlled member being derived from an external source.

Another object of the present invention lies in the provision of a mechanical servo mechanism of the above character that automatically changes the speed of the controlled member in response to changes in speed of the controlling member, the said mechanism having means for visually indicating the velocity of rotation of the members.

Still another object of the present invention is to provide a novel servo mechanism of the above character that is responsive to the direction of rotation of the control member and serves to rotate the controlled member in the corresponding direction.

Still another object of the present invention lies in the provision of a novel mechanical servo mechanism that is of simple, rugged construction and which is reliable in operation.

Other objects and advantages will become apparent from the specification, taken in connection with the accompanying drawing, wherein one embodiment of the invention is illustrated.

In the drawing—

Fig. 1 is a central sectional view of the novel servo mechanism of this invention.

Fig. 2 is a view similar to Fig. 1, of a slightly modified construction.

Fig. 3 is a central vertical section of the structure of Fig. 1.

Fig. 4 is a part sectional view of a modified construction.

Similar characters of reference are used in all of the above figures to indicate corresponding parts.

Referring now to Figs. 1 and 3, the reference numeral 1 designates a control member or primary element which is illustrated as a repeater motor actuated from a master compass. This control member may be a manually operated crank or any rotatable member, such as an electric, hydraulic or pneumatic motor, or a prime mover, such as a gas or steam engine, the motion of which it is desired to repeat with increased torque. The shaft 2 of motor or control member 1 is journaled in fixed bearings 3 and 4 which allow rotation of shaft 2 but prevent axial movement thereof. Shaft 2 is threaded at 5 between bearings 3 and 4 to provide a lead screw, the threads of which are preferably of fine pitch and square section.

A nut member 6 is internally threaded to a running fit with the threaded portion 5 of shaft 2 and is borne by this shaft. This nut member is free to turn on the threaded portion of shaft 2 and has a pinion 7 fixed to one end thereof for driving a gear 8 fixed on the shaft 9 of the controlled member (not shown), which may be a rudder or other driven means. Pinion 7 is arranged in sliding mesh with gear 8, i. e., this pinion may move longitudinally with respect to gear 8, but never disengages the latter.

The nut member 6 has fixed thereon the planetary arm 10 of a differential gear system. Arm 10 carries two pairs of intermeshing idler pinions 12 and 13. Pinions 12 also mesh with a gear 14 formed upon the hub 15 of a friction roller 16 that engages the surface of a driving disc 17, or the like. Pinions 13 also mesh with a gear 18 formed upon the hub 19 of a friction roller 20, similar to friction roller 16, and also engaging the surface of the driving disc 17. The friction rollers 16 and 20 are rotatably mounted upon the cylindrical outer surface of nut member 6 as by the use of anti-friction bearings 22, but these friction rollers are held against axial movement on nut member 6 as by pinion 7 abutting the friction roller 16 and the collar 23 fixed on nut member 6 and abutting the friction roller 20.

Driving disc 17 is provided with peripheral teeth 24 which mesh with the teeth of a pinion 25 fixed on the shaft of a constant speed drive motor 26, whereby disc 17 is adapted to be rotated at constant speed. Disc 17 is rotatably supported on anti-friction bearings 21 and 27 that are carried by a hinge plate 28 that is hinged at 29 upon a fixed support. A tension spring 30 has one end connected to a fixed support and its other end connected to the hinge plate 28 and serves, by urging the hinge plate about its pivot 29, to press the driving disc 17 against the friction rollers 16 and 20, thereby effecting driving of the latter.

The collar 23 is provided with a peripheral annular groove or slot 31 into which projects the lower end portion of a lever 32 that is pivoted at 33 upon a fixed support. Preferably, the lower end of lever 32 is formed with a clevis for engaging in the slot 31. The upper end portion of lever 32 is formed with a pointer 34 for moving over a scale 35. Scale 35 is adapted to be marked in graduations corresponding to velocity, i. e., the velocity of the control member 1. As will further appear, the position assumed by pointer 34 on scale 35 will directly indicate the velocity of shaft 2 of element 1, i. e., the first derivative of the angular displacement of shaft 2 with respect to time or $$\frac{d\theta}{dt}.$$

In use, assuming that the control member shaft 2 is stationary, the friction rollers 16 and 20 will engage the driving disc 17 at points whose radial distances from the center of disc 17 are equal and are positioned on opposite sides of the rotating axis of this disc, whereby the rollers 16 and 20 rotate at equal speeds but in opposite directions so that no rotation of planetary arm 10 takes place, the pinions 12 and 13 merely turning idly on gears 14 and 18 without effecting the turning of arm 10. If it be assumed, for the sake of illustration, that the rollers 16 and 20 are at unequal radial distances from the center of disc 17, then one of these rollers will be driven by disc 17 at a faster speed than the other, thereby causing the turning of arm 10 so that nut member 6 is caused to thread itself along shaft 2 until the speeds of rollers 16 and 20 are again equal, which occurs when these rollers are at equal radial distances from the center of disc 17.

If now the control member 1 is energized so as to turn its shaft 2, the threaded portion 5 of this shaft will turn within nut member 6, thereby moving this nut member together with pinion 7 and rollers 16 and 20 one way or the other across the disc 17, depending upon the direction of rotation of shaft 2. It will be noted that the control member 1 need exert but a slight torque to turn its shaft 2, since pinion 7 is in sliding contact with the load gear 8 and only sliding friction need be overcome by the turning of shaft 2, i. e., the movement of the input system to produce torque does not involve the driving of the load, but merely involves movement at right angles to the load torque.

As the nut member 6 and rollers 16 and 20 start to move across the disc 17 due to the rotation of shaft 2, one of these rollers will rotate faster than the other, thereby turning planetary arm 10 and rotating nut member 6 in a direction tending to return the transversely movable system 6, 16 and 20 to its central position. Thus, shaft 2 tends to move the nut member 6 in a direction across the disc 17 away from its central position, whereas the rollers 16 and 20, acting through the differential, tend to move the nut member in the reverse direction toward its central position with respect to the disc 17, so that with disc 17 rotating at constant speed, the displacement of the nut member from center at any time is a measure of the velocity of shaft 2, i. e., the first time derivative of the angular displacement of shaft 2. This will be apparent when it is noted that disc 17, turning at constant speed, is a measure of time and the displacement of the nut member from center is representative of the change of angular displacement of shaft 2 with respect to time (i. e., rotating disc 17). Since collar 23 is carried by nut member 6, the pointer 34 actuated from collar 23 will indicate the velocity of shaft 2 on scale 35.

Thus one revolution of shaft 2 must result in the turning of nut member 6 and pinion 7 through one revolution in order to return the system to center. For any speed of the input shaft 2 there is an equal speed of the nut member 6, which member assumes a displacement from its central position that just balances the input speed. Thus, if pinion 7 and gear 8 are geared 1 to 1, the speed of driven shaft 9 will always equal that of shaft 2 and regardless of the ratio of gears 7 and 8, the speed of shaft 9 will be proportional to that of shaft 2. If shaft 2 is driven at fast speed, the pinion 7 will be driven at an equally fast speed, the power step-up being derived from the motor 26 and not from the shaft 2, thereby enabling input or control members of relatively feeble torque capacity to be used in connection with the servo mechanism of this invention. If the input speed of shaft 2 is quickly reduced to zero, the output speed of pinion 7 will likewise approach zero as the nut member 6 approaches center position at a decreasing rate resembling an exponential decrement. Thus, the servo mechanism of this invention is adapted for high speeds and large powers without danger of overrunning or hunting around the zero position.

The structure shown in Fig. 2 is similar to that of Figs. 1 and 3 with the exception that a bevel gear differential is used instead of the spur gear differential of the previously described figures, similar parts of Figs. 1 and 2 being similarly numbered in the drawing. In Fig. 2 the hubs 15 and 19 of friction rollers 16 and 20 carry bevel gears 14' and 18' which mesh with bevel idlers 37 carried by planetary arm 10. The operation of the structure of Fig. 2 is similar to that of Figs. 1 and 3 and would appear to require no further description.

In Fig. 4, a somewhat modified arrangement is shown. In this figure, the control member or primary element 39 is connected to rotate one bevel gear 40 of differential gearing having a planetary arm 41 fixed on a shaft 42, to which the controlled member or secondary element is connected to be driven either directly or through suitable gearing. Arm 41 carries bevel idler pinions 43 which mesh with the gear 40 and the other differential bevel gear 44. Gear 44 has a spur gear 45 fixed on the hub thereof for meshing with a gear 46 fixed on a nut member 47, which latter member is free to turn but is held against longitudinal movement in a pedestal bearing 48. Nut member 47 is threaded upon a rod 49 that carries a ball cage 50. Contacting balls 51 and 52 are contained within cage 50, the former of which engages a driving disc 17 similar to that previously described in connection with Figs. 1 to 3, and which is similarly driven and mounted, parts of Fig. 4 which are similar to parts of the preceding figures being similarly numbered.

Rod 49 carries a grooved collar 23' for actuating a lever 32' fulcrumed at 33' and having a pointer 34' for moving over a velocity scale 35'. The ball 52 contacts with a roller 53 mounted in fixed bearings 54. The shaft of roller 53 has a gear 55 fixed thereon that meshes with a gear 56 fixed on shaft 42.

In use, as long as the control member 39 is stationary, the ball 51 will remain at the center of driving disc 17. This will be apparent when it noted that if ball 51 should for any reason be moved off the center position of disc 17 when member 39 is stationary, the roller 53 will be driven by ball 52 and effect turning of arm 41 so that pinions 43, revolving on stationary gear 40, will cause the turning of gear 44 and hence will turn nut member 47 to effect the longitudinal shifting of rod 49 to bring ball 51 back to its central non-rotating position.

If the control member 39 should start to rotate, it will cause gear 40, acting through pinions 43, to rotate gear 44, the arm 41 being stationary. Rotation of gear 44 causes nut member 47 to turn and effect longitudinal movement of rod 49, thereby moving ball 51 from its central position and effecting the driving of roller 53, which in turn acts through gears 55 and 56 to turn arm 41 in a direction tending to reverse the direction of movement of gear 44 and hence tending to return the ball 51 to its central position. The amount that ball 51 is displaced from the center of disc 17 at any time is a measure of the velocity of rotation of the control member 39 and is indicated visually on scale 35' by pointer 34'. The speed of shaft 42 connected to the controlled member is always equal or proportional to that of member 39. It will be noted that the control member 39 merely has to overcome essentially the sliding friction of balls 51 and 52 upon disc 17 and roller 53, respectively, and hence may be of relatively small power, whereas the torque output of shaft 42, driven from disc 17, may be large for operating any desired controlled member.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In a mechanical servo mechanism, a rotatable control member, a driving disc rotatable at constant speed, radially adjustable power transmission means frictionally engaging the surface of said disc to be driven by the latter, a controlled member, a threaded shaft and a nut threaded thereon, one of which is driven by said control member and the other of which drives said controlled member, and which jointly control the radial position of said transmission means, and differential gearing connected to said power transmission means and to said nut, whereby said controlled member is driven from said transmission means by the power supplied from said disc at a speed proportional to the speed of rotation of said control member.

2. In a mechanical servo mechanism, a rotatable control member, a continuously rotating driving disc, a friction drive member contacting with said driving disc, means operated from said control member for shifting said friction drive member radially outwardly over said driving disc in response to increase in speed of said control member, said means including differential gearing, a threaded shaft and a revoluble nut thereon actuated from one arm of said gearing, a rotatable controlled member, means driven from said friction drive member for driving said controlled member, and means also operated from said friction drive member urging said friction drive member radially inwardly over said driving disc in opposition to the action of said control member, said last named means including said differential gearing, said threaded shaft and revoluble nut.

3. In a mechanical servo mechanism, a rotatable control member, a constantly rotating driving disc, a friction drive member contacting with said driving disc, means operated from said control member for shifting said friction drive member radially outwardly over said driving disc in response to increase in speed of said control member, said means including differential gearing, a threaded shaft and a revoluble nut thereon actuated from one arm of said gearing, a rotatable controlled member, means driven from said friction drive member for driving said controlled member, and means also operated from said friction drive member urging said friction drive member radially inwardly over said driving disc in opposition to the action of said control member, said last named means including said differential gearing, said threaded shaft and revoluble nut, and velocity indicating means operated in response to the radial movements of said friction drive member.

4. In a mechanical servo mechanism, a rotatable control member having a threaded drive shaft, a constantly rotating driving disc, a three arm differential gearing having one arm threaded upon said drive shaft, friction rollers engaging said driving disc on opposite sides of the center thereof and connected respectively to the other two arms of said differential gearing, and a rotatable controlled member connected so as to be driven by the first mentioned arm of said differential gearing.

5. In a mechanical servo mechanism, a rotatable control member, a continuously rotating driving disc, a friction drive member driven by said driving disc, nut and screw means for moving said friction drive member over said driving disc, differential gearing having gears connected to said control member and to said nut and screw means, respectively, and having its planetary arm connected to said friction drive member to be driven by the latter, and a controlled member connected in driven relation from said planetary arm.

6. In a mechanical servo mechanism, a rotatable control member having a threaded drive shaft, a driving disc, motive means for rotating said driving disc at predetermined speed, a pair of friction rollers engaging said driving disc on opposite sides of the center thereof, a three arm differential gearing having one arm threaded upon said drive shaft and having its two other arms connected respectively to said respective friction rollers, and a rotatable controlled member connected to be driven from said planetary arm.

7. In a mechanical servo mechanism, a rotatable control member having a threaded drive shaft, a driving disc, motive means for rotating said driving disc at predetermined speed, a pair of friction rollers engaging said driving disc on opposite sides of the center thereof, a three arm differential gearing having one arm threaded upon said drive shaft and having its two other arms connected respectively to said respective friction rollers, a rotatable controlled member connected to be driven from said planetary arm, and velocity indicating means actuated by movement of said planetary arm along said drive shaft.

8. In a mechanical servo mechanism, a rotatable control member, a continuously rotating driving disc, a friction drive member contacting with said driving disc, a three arm differential gear, means operated from said control member effective through one arm of said differential and including a threaded shaft and a revoluble nut for shifting said friction drive member radially outwardly over said driving disc in response to increase in speed of said control member, a rotatable controlled member, means driven from said friction drive member for driving another arm of said differential and said controlled member, and means also operated from said friction drive member through the third arm of said differential and said revoluble nut and threaded shaft, urging said friction drive member radially inwardly over said driving disc in opposition to the action of said control member.

9. In a mechanical servo mechanism, a rotatable control member, a three arm differential gear, one arm of which is driven from said member, a continuously driven driving disc, a radially shiftable friction drive member contacting therewith and driving a second arm of said differential, means driven by the third arm of said differential for radially positioning said friction member on said disc, and a controlled device driven from said second arm by the power supplied from said disc and at a speed proportional to the speed of said control member.

FREDERICK S. HODGMAN.